US012264597B2

United States Patent
Gemeinhardt et al.

(10) Patent No.: US 12,264,597 B2
(45) Date of Patent: Apr. 1, 2025

(54) MONOLITHIC COMPOSITE BLADE AND PLATFORM

(71) Applicant: General Electric Company, Schenectady, NY (US)

(72) Inventors: Gregory Carl Gemeinhardt, Park Hills, KY (US); Nicholas Joseph Kray, Mason, OH (US); Andreas Mastorakis, Corona, CA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/070,618

(22) Filed: Nov. 29, 2022

(65) Prior Publication Data

US 2023/0228198 A1    Jul. 20, 2023

Related U.S. Application Data

(62) Division of application No. 16/375,179, filed on Apr. 4, 2019, now abandoned.

(51) Int. Cl.
*F01D 5/28* (2006.01)
*F02C 3/04* (2006.01)

(52) U.S. Cl.
CPC ............... *F01D 5/282* (2013.01); *F02C 3/04* (2013.01); *F05D 2220/32* (2013.01);
(Continued)

(58) Field of Classification Search
CPC .......... F01D 5/147; F01D 5/282; F01D 5/284; C04B 2237/38; B32B 2603/00; B32B 2260/04
See application file for complete search history.

(56) References Cited

U.S. PATENT DOCUMENTS

| 1,476,626 A | 12/1923 | Losel |
| 2,916,257 A | 12/1959 | Poellmitz et al. |

(Continued)

FOREIGN PATENT DOCUMENTS

| CN | 1612962 A | 5/2005 |
| CN | 101070858 A | 11/2007 |

(Continued)

OTHER PUBLICATIONS

Kruse et al., Bonding of CFRP Primary Aerospace Structures - Discussion of the Certification Boundary Conditions and Related Technology Fields Addressing the Needs for Development, ECCM16—16th European Conference on Composite Materials, Seville Spain, Jun. 22-26, 2014, 9 Pages.

(Continued)

*Primary Examiner* — Justin D Seabe
(74) *Attorney, Agent, or Firm* — Dority & Manning, P.A.

(57) ABSTRACT

A component for a gas turbine engine. The component includes a continuous fiber blade including an airfoil extending radially between a root and a tip and a blade attachment feature positioned at or adjacent to the root. The component further includes a platform coupled to the root of the continuous fiber blade. The platform includes a plurality of chopped fibers. Additionally, the component includes a thermoplastic polymer contained in both the continuous fiber blade and the platform. Moreover, the continuous fiber blade and platform are coupled together such that the continuous fiber blade and platform form a monolithic composite body.

20 Claims, 6 Drawing Sheets

(52) U.S. Cl.
CPC .... *F05D 2230/50* (2013.01); *F05D 2300/603* (2013.01); *F05D 2300/614* (2013.01)

(56) References Cited

U.S. PATENT DOCUMENTS

| | | | |
|---|---|---|---|
| 3,309,058 | A | 3/1967 | Blackhurst et al. |
| 3,532,438 | A | 10/1970 | Palfreyman et al. |
| 4,331,495 | A | 5/1982 | Lackman et al. |
| 5,529,652 | A | 6/1996 | Asai et al. |
| 6,290,895 | B1 | 9/2001 | Wang et al. |
| 6,312,224 | B1 | 11/2001 | Knott et al. |
| 6,558,146 | B1 | 5/2003 | Shah et al. |
| 7,491,032 | B1 | 2/2009 | Powell et al. |
| 7,931,442 | B1 | 4/2011 | Liang |
| 8,011,877 | B2 | 9/2011 | Schilling et al. |
| 8,348,619 | B2 | 1/2013 | Derclaye et al. |
| 8,727,730 | B2 | 5/2014 | Liotta et al. |
| 9,239,062 | B2 * | 1/2016 | Lamboy ................ F01D 11/008 |
| 9,482,108 | B2 | 11/2016 | Garcia Crespo |
| 10,024,173 | B2 | 7/2018 | McCaffrey |
| 10,046,482 | B2 * | 8/2018 | Marsal ................ C04B 35/565 |
| 10,577,939 | B2 | 3/2020 | Vetters et al. |
| 10,648,352 | B2 | 5/2020 | Paige et al. |
| 2006/0222502 | A1 | 10/2006 | Hansen et al. |
| 2010/0111699 | A1 | 5/2010 | Morris et al. |
| 2010/0166560 | A1 | 7/2010 | Blanchard et al. |
| 2011/0027090 | A1 | 2/2011 | Casavant et al. |
| 2011/0121487 | A1 | 5/2011 | Topping et al. |
| 2011/0230615 | A1 | 9/2011 | Van Der Woude et al. |
| 2012/0099995 | A1 | 4/2012 | Delvaux et al. |
| 2012/0133067 | A1 | 5/2012 | Ashida |
| 2013/0142988 | A1 | 6/2013 | Grelin |
| 2013/0186304 | A1 | 7/2013 | Pabla et al. |
| 2014/0186166 | A1 | 7/2014 | Kostka |
| 2015/0101351 | A1 | 4/2015 | Healy et al. |
| 2016/0024939 | A1 * | 1/2016 | Nilsson ................ F01D 5/303 29/889.21 |
| 2016/0130955 | A1 * | 5/2016 | Kray ................ F01D 5/3038 29/889.71 |
| 2016/0160680 | A1 | 6/2016 | Turner et al. |
| 2016/0186774 | A1 | 6/2016 | Manicke et al. |
| 2016/0258319 | A1 | 9/2016 | Turner et al. |
| 2016/0341071 | A1 | 11/2016 | Alarcon et al. |
| 2017/0191493 | A1 | 7/2017 | Kray et al. |
| 2017/0292388 | A1 * | 10/2017 | Watanabe ............. F01D 5/3084 |
| 2017/0326757 | A1 | 11/2017 | Marin et al. |
| 2018/0171805 | A1 | 6/2018 | Freeman et al. |
| 2018/0283187 | A1 | 10/2018 | Kray et al. |

FOREIGN PATENT DOCUMENTS

| | | |
|---|---|---|
| CN | 102536326 A | 7/2012 |
| CN | 102729483 A | 10/2012 |
| CN | 103192464 A | 7/2013 |
| DE | 102006025280 A1 | 12/2006 |
| EP | 0810081 A1 | 12/1997 |
| EP | 1855011 A1 | 11/2007 |
| EP | 2253806 A2 | 11/2010 |
| EP | 2472063 A1 | 7/2012 |
| EP | 2529918 A2 | 12/2012 |
| GB | 1328167 A | 8/1973 |
| GB | 2262315 A | 6/1993 |
| JP | H0472500 A | 3/1992 |
| JP | 2007001089 A | 1/2007 |
| WO | WO 03/060231 A1 | 7/2003 |
| WO | WO2011/125596 A1 | 10/2011 |

OTHER PUBLICATIONS

Tri-Mack Plastics Manufacturing Corporation, Tri-Mack Hybrid Molding, Nov. 5, 2015. https://vimeo.com/144758280 (Video—Web Link).

\* cited by examiner

MONOLITHIC COMPOSITE BLADE AND PLATFORM

CROSS-REFERENCE TO RELATED APPLICATIONS

This application is a divisional of U.S. patent application Ser. No. 16/375,179 filed Apr. 4, 2019. The contents of that application is incorporated herein by reference in their entirety as if set forth verbatim.

FIELD

The present subject matter relates generally to monolithic composite components and, more particularly, to monolithic composite blades and platforms for gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The compressor section of the gas turbine engine typically includes a number of airfoils or blades attached to a rotor of the gas turbine engine. Further, the compressor section generally includes platforms positioned between the airfoils in order to define an inner boundary for the air provided from the fan section to the inlet of the compressor. Accordingly, at least some known gas turbine engines include airfoils and platforms formed separately and removably coupled together and attached to the rotor of the gas turbine engine. However, such airfoil-platform assemblies require additional process steps in order to couple the airfoils and platforms together, such as secondary bonding or fastening. Additionally, sealing may be required between the components of the airfoil-platform assembly. Further, such sealing may include leaks that reduce the efficiency of the gas turbine engine.

As such, there is a need for an airfoil-platform assembly that enables a reduction in the number of process steps and an increased efficiency of a gas turbine engine.

BRIEF DESCRIPTION

Aspects and advantages will be set forth in part in the following description, or may be obvious from the description, or may be learned through practice of the invention.

In one aspect, the present subject matter is directed to a component for a gas turbine engine. The component includes a continuous fiber blade including an airfoil extending radially between a root and a tip and a blade attachment feature positioned at or adjacent to the root. The component further includes a platform coupled to the root of the continuous fiber blade. The platform includes a plurality of chopped fibers. Additionally, the component includes a thermoplastic polymer contained in both the continuous fiber blade and the platform. Moreover, the continuous fiber blade and platform are coupled together such that the continuous fiber blade and platform form a monolithic composite body.

In an additional embodiment, the continuous fiber blade may define a pressure side and a suction side. Further, the platform may be coupled to the pressure side or suction side of the continuous fiber blade. In another embodiment, the platform may include two platforms. A first platform may be coupled to the pressure side of the continuous fiber blade, and a second platform may be coupled to the suction side of the continuous fiber blade. In another embodiment, the platform may include a split platform defining a notch such that the continuous fiber blade is received within the notch and coupled to the split platform at the notch.

In another embodiment, the continuous fiber blade may be formed, at least in part, by molding of a continuous fiber thermoplastic composite. In a further embodiment, the platform may be formed, at least in part, by at least one of compression molding or injection molding of the plurality of chopped fibers. In one such embodiment, the platform may be coupled to the continuous fiber blade via injection molding at an interface between the platform and the continuous fiber blade. In another such embodiment, the platform may be coupled to the continuous fiber blade simultaneously with the molding of the platform. In a further embodiment, the thermoplastic polymer may include a bonding layer between the continuous fiber blade and the platform. In a still further embodiment, the thermoplastic polymer may include at least one of PEKK, PEEK, PAEK, or PEI.

In another aspect, the present subject matter is directed to a gas turbine engine defining a centerline. The gas turbine engine includes an engine shaft extending along the centerline, a compressor attached to the engine shaft and extending radially about the centerline, a combustor positioned downstream of the compressor to receive a compressed fluid therefrom, and a turbine mounted on the engine shaft downstream of the combustor to provide a rotational force to the compressor. The gas turbine engine further includes a monolithic composite component connected to the engine shaft. The monolithic composite component includes a continuous fiber blade including an airfoil extending radially outward from a root to a tip and a blade attachment feature positioned at or adjacent to the root. The monolithic composite component further includes a platform coupled to the root of the continuous fiber blade. The platform includes a plurality of chopped fibers. Additionally, the monolithic composite component includes a thermoplastic polymer contained in both the continuous fiber blade and the platform. Moreover, the continuous fiber blade and platform are coupled together such that the continuous fiber blade and platform form a monolithic composite body.

In one embodiment, the gas turbine engine may include a plurality of monolithic composite components. In such an embodiment, a portion of the monolithic composite components may be arranged circumferentially about the centerline to form a stage. In one such embodiment, the platforms of each of the plurality of monolithic composite components may extend at least partially in a circumferential direction relative to the centerline. Further, the platform of at least two adjacent monolithic composite components of the portion of the monolithic composite components may define a butt joint therebetween in the circumferential direction. It should be further understood that the gas turbine engine may further include any of the additional features as described herein.

In another aspect, the present subject matter is directed to a method of forming a monolithic composite component for a gas turbine engine. The method includes molding a continuous fiber thermoplastic composite into a continuous fiber blade including an airfoil extending radially outward from a root to a tip and a blade attachment feature positioned at or adjacent to the root. The method additionally includes forming a plurality of chopped fibers into a platform containing a thermoplastic polymer. Further, the method includes coupling the platform to the root of the continuous fiber blade such that the platform and continuous fiber blade form the monolithic composite component.

In one embodiment, forming the plurality of chopped fibers into the platform may include at least one of compression molding or injection molding of the chopped fibers. In another embodiment, coupling the platform to the root of the continuous fiber blade may include utilizing injection molding at an interface between the platform and the continuous fiber blade. In a still further embodiment, coupling the platform to the root of the continuous fiber blade may include simultaneously coupling the platform to the continuous fiber blade while molding the platform. It should be further understood that the method may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 5 illustrates another view of an exemplary monolithic composite component in accordance with aspects of the present disclosure, particularly, FIG. 5 illustrates a partially exploded view of the monolithic composite component where one platform is separated from a blade while another platform is shown monolithically formed to the blade.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A monolithic composite component for a gas turbine engine and associated methods for forming the same are generally provided. The component may include a continuous fiber blade including an airfoil extending radially between a root and a tip. The continuous fiber blade may further include a blade attachment feature positioned at or adjacent to the root. Additionally, the component may include one or more platforms coupled to the root of the continuous fiber blade. The platform(s) may include a plurality of chopped fibers. Additionally, the component may include a thermoplastic polymer contained in both the continuous fiber blade and the platform. The thermoplastic polymer may allow for the platform(s) containing the chopped fibers to be monolithically formed to the continuous fiber blade. Moreover, the continuous fiber blade and platform(s) may be coupled together such that the continuous fiber blade and platform(s) form a monolithic composite body. For instance, in certain embodiments, the platform(s) may be coupled to the blade utilizing injection molding, or the platform(s) may be formed to the blade during a molding process of the platform(s). As such, the composite components of the present disclosure may reduce the process steps involved in assembling multiple separate parts before or simultaneously with attaching the component within the gas turbine engine. Further, a monolithic composite component, as described herein, may reduce the number of seals required within the engine, potentially increasing the efficiency of the gas turbine engine. Moreover, the platform(s) formed from chopped fibers may be more easily formed into complex shapes desired within the platform(s), while the continuous fibers of the blade may allow for greater strength to withstand the aerodynamic loads on the blade.

Figure 1:
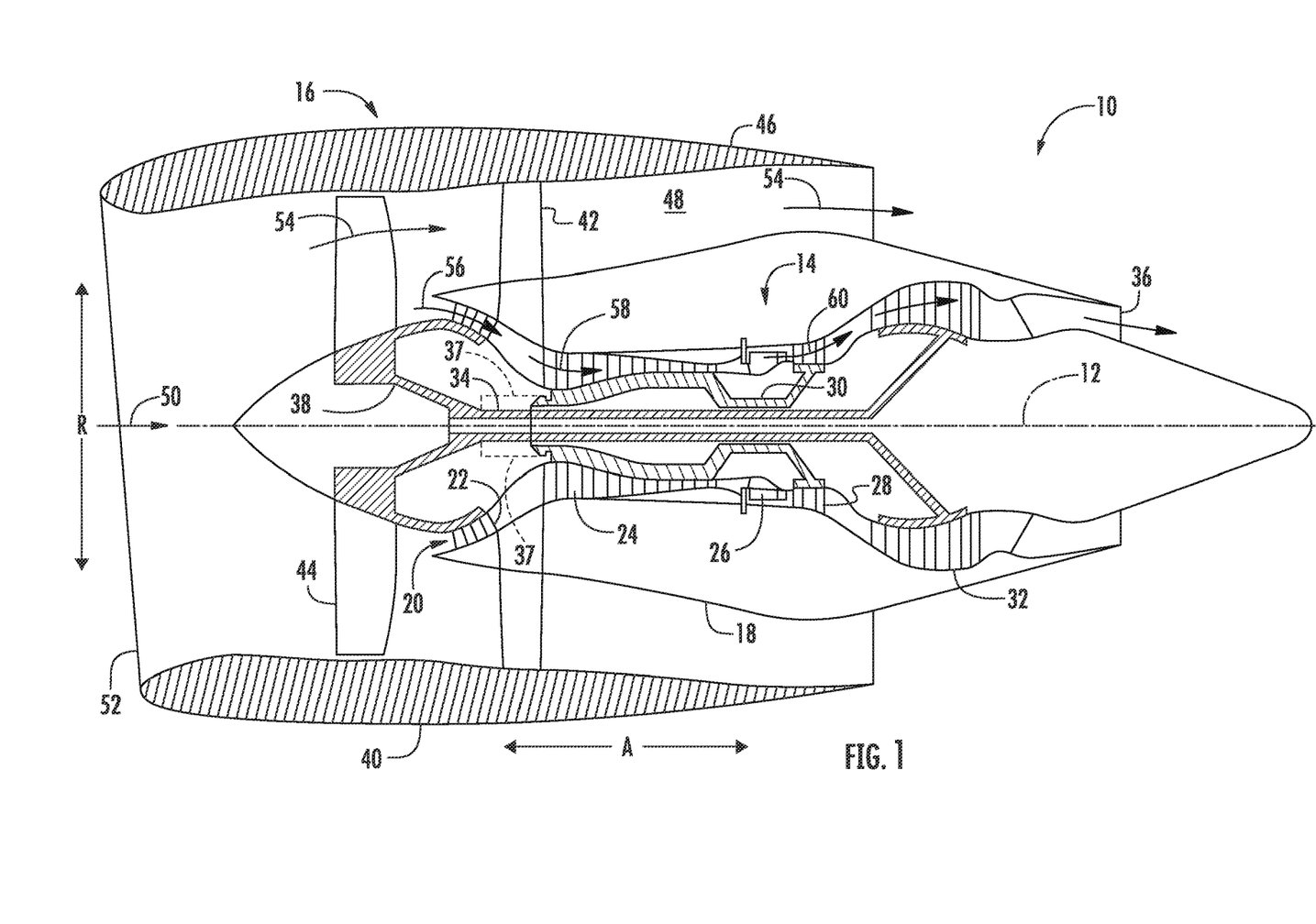
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk (not shown), such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk may be enclosed or formed as part of a fan hub 41.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The LP compressor 22 may include a plurality of rotor blades (LP rotor blades 45) enclosed by the outer casing 18. The pressure of the second compressed air flow 56 is then increased and enters the HP compressor 24 (as indicated by arrow 58). Additionally, the HP compressor 24 may include a plurality of rotor blades (HP rotor blades 47) enclosed by the outer casing 18. After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
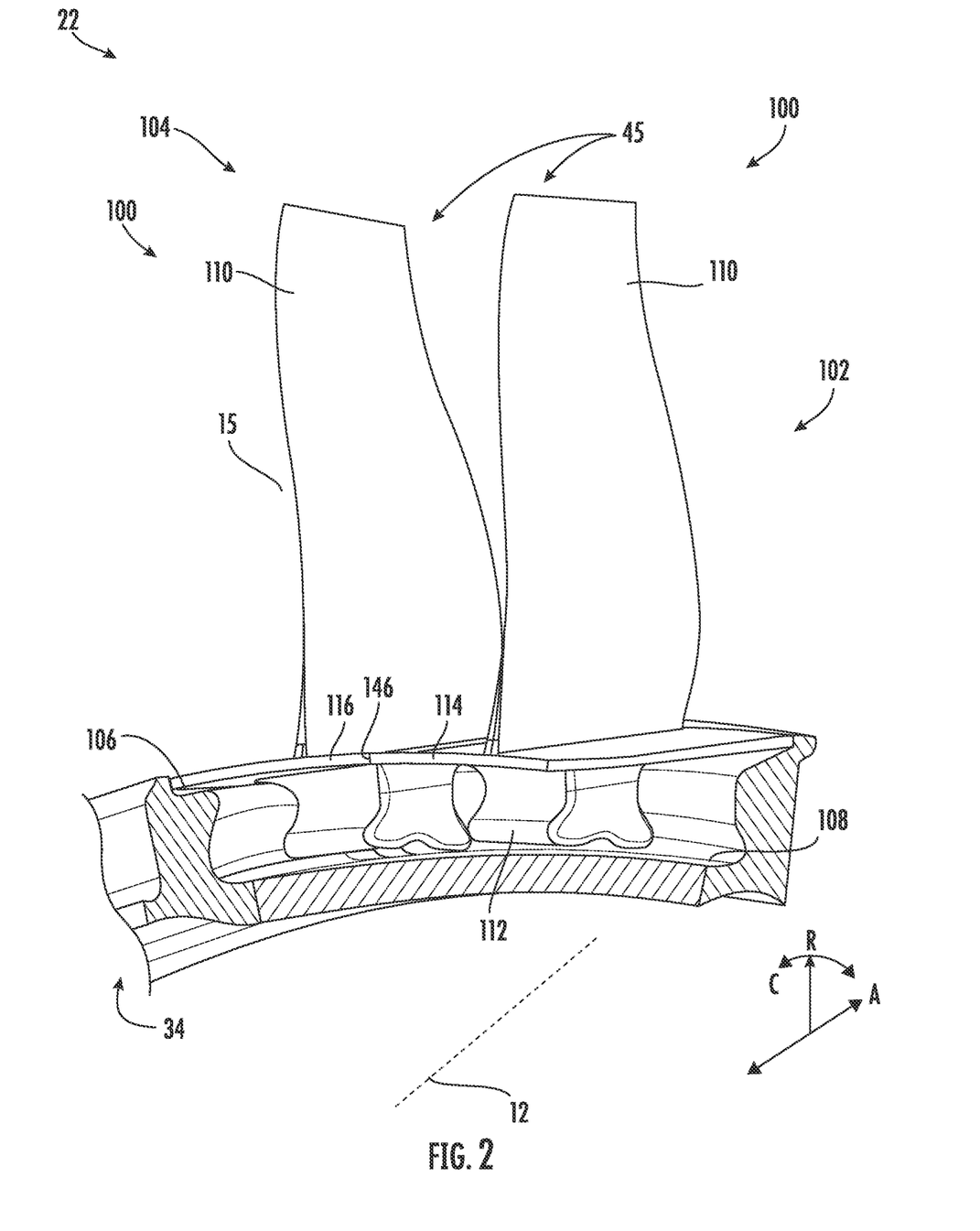
FIG. 2 illustrates one embodiment of a monolithic composite component for a gas turbine engine in accordance with aspects of the present subject matter, particularly illustrating two monolithic composite components arranged circumferentially about a centerline to form a stage.

Referring now to FIG. 2, one embodiment of a monolithic composite component 100 for a gas turbine engine 10 is illustrated in accordance with aspects of the present subject matter. More particularly, FIG. 2 illustrates two monolithic composite components 100 arranged circumferentially about the centerline 12 to form a stage 102. It should be appreciated that monolithic, as used herein, means irreversibly coupled together or formed together in order to create one indivisible component. Though two monolithic composite components 100 of the stage 102 are illustrated in FIG. 2 for exemplary purposes, it should be appreciated that the stage 102 may include three or more monolithic composite components 100 such that the monolithic composite components are equally spaced about the centerline 12 in the circumferential direction C. Generally, as illustrated in FIG. 2, the monolithic composite component 100 will be described as a component of the LP compressor 22 including LP rotor blade 45 as described generally in reference to FIG. 1. However, it should be appreciated that the following description may be equally applicable to any other airfoil or blade of the gas turbine engine 10, such as a fan blade 44 or an HP rotor blade 47. In particular embodiments, the monolithic composite component 100 may include one of the first several HP rotor blades 47 of the HP compressor 24. However, in other embodiments, the monolithic composite component 100 may include a blade and/or airfoil of the HP turbine 28 or the LP turbine 32. Further, it should be appreciated that, in general, the disclosed monolithic composite component 100 may generally be utilized with any suitable gas turbine engine having any suitable configuration.

FIG. 2 additionally illustrates a partial cutaway view of an example compressor rotor 104 of the LP compressor 22, according to at least some aspects of the present disclosure, in order to place the monolithic composite component 100 in an exemplary field of use. However, the rotor may be one of an HP compressor rotor, HP turbine rotor, LP turbine rotor, or the fan rotor 38 in another context. The compressor rotor 104 may include the LP shaft 34, which may include a generally radially outward facing, circumferentially oriented shaft attachment feature 106, such as, but not limited to, a circumferentially oriented dovetail slot 108. Individual blades 110 may be releasably mounted to LP shaft 34 to extend radially outward, such as by engagement of a generally circumferentially oriented blade attachment feature 112 with shaft attachment feature 106. For example, dovetail slot 108 may be configured to slidably receive blade attachment feature 112 therein.

Figure 3:
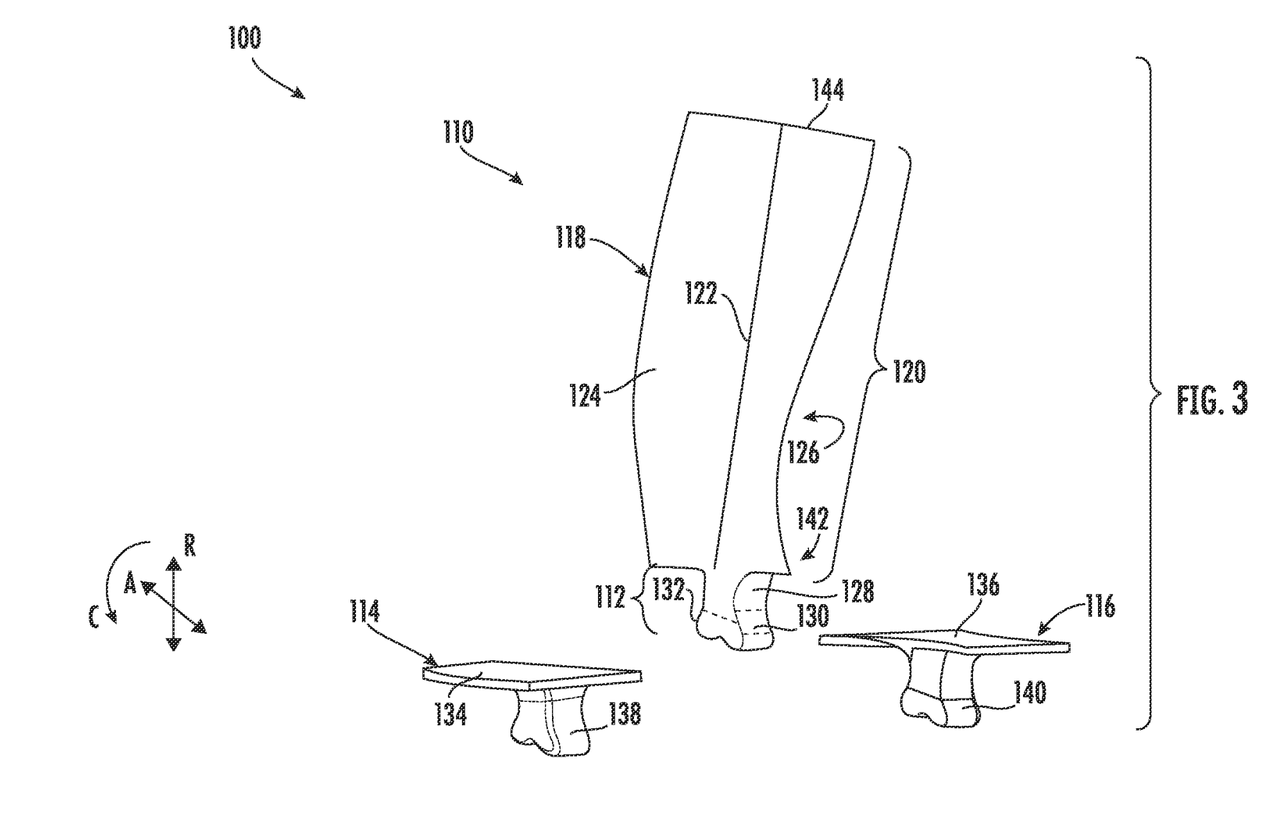
FIG. 3 illustrates an exploded perspective view of an exemplary monolithic composite component in accordance with aspects of the present subject matter, particularly illustrating the monolithic composite component including a blade and platforms.

Referring now to FIG. 3, an exploded perspective view of an example monolithic composite component 100 is illustrated in accordance with aspects of the present subject matter. Particularly, FIG. 3 illustrates the blade 110 and platforms 114, 116, according to at least some aspects of the present disclosure. It should be appreciated that though the blade 110 and platforms 114, 116 are shown separated for illustrative purposes in FIG. 3, the blade 110 and at least one of the platforms 114, 116 may be inseperably coupled together to form the monolithic composite component 100. The blade 110 may include a composite blade panel 118, which may include at least one of an airfoil 120 or blade attachment feature 112. As described in more detail below in regard to FIG. 5, the airfoil 120 and/or blade attachment feature 112 may be a continuous fiber airfoil and a continuous fiber attachment feature formed together. More particularly, the composite blade panel 118 may be a continuous fiber composite blade panel formed integrally. Airfoil 120 may be arranged such that its span 122 extends generally radially outward with respect to the gas turbine engine 10 centerline 12 (FIGS. 1 and 2) from a root 142 to a tip 144. The blade 110 may define a pressure side 124 and a suction side 126. More particularly, the airfoil 120 may include at least one of a pressure side 124 or a suction side 126. Blade attachment feature 112 may be disposed radially inward from the airfoil 120 with respect to centerline 12 such that the attachment feature 112 is positioned at or adjacent to the root 142 and/or may be circumferentially oriented with the centerline 12. Further, the platform(s) 114, 116 may be inseperably coupled to the root 142 of the blade 110, such as at the blade attachment feature 112.

Blade attachment feature 112 may be generally shaped as a dovetail and may include at least one of a neck 128, a forward lobe 130, or an aft lobe 132. Forward lobe 130 and/or aft lobe 132 may be radially inward from the neck 128 with respect to the centerline 12 (FIG. 1). Blade attachment feature 112 may have a substantially uniform cross-section in the circumferential direction with respect to centerline 12. Platform 114 may be disposed generally adjacent to the pressure side 124. Further, platform 116 may be disposed generally adjacent to the suction side 126. Alternatively, platform 114 may be disposed generally adjacent to the pressure side 124 and platform 116 may be disposed generally adjacent to the suction side 126. Platforms 114, 116 may extend generally circumferentially from blade panel 118 with respect to the centerline 12 (FIG. 1). Further, the platform(s) 114, 116 may be coupled to the root 142 of the blade 110 (e.g., monolithically and irreversibly formed to the blade 110) in order to form a monolithic composite body. As described in more detail in regard to FIG. 5, the platform(s) 114, 116 may include a plurality of chopped fibers. Platforms 114, 116 may include radially outward facing flowpath surfaces 134, 136, respectively, each of which may be generally shaped as a segment of a cylinder. Platforms 114, 116 may include radially inwardly extending attachment features 138, 140, respectively, which may be configured to releasably engage shaft attachment feature 106 (FIG. 2). Attachment features 138, 140 of platforms 114, 116 may be constructed to have substantially the same circumferential cross-sections as blade attachment feature 112. Further, in one arrangement, the platform 114 of a first monolithic composite component 100 may define a butt joint 146 with the platform 116 of an adjacent monolithic composite component 100 in the circumferential direction C (see FIG. 2). Moreover, the monolithic composite components 100 may be in sealing engagement at one or more butt joints 146 between adjacent monolithic composite components 100 (e.g., adjacent monolithic composite components 100 in a stage 102).

Figure 4:
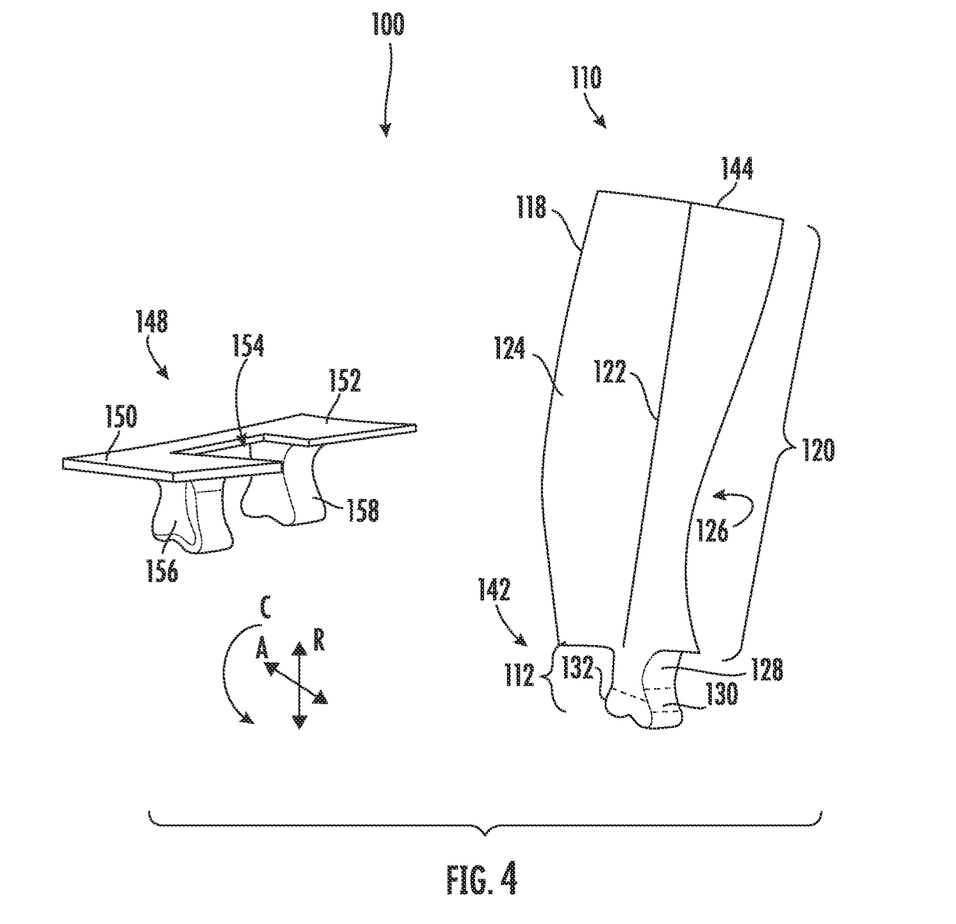
FIG. 4 illustrates an exploded perspective view of an alternative exemplary monolithic composite component in accordance with aspects of the present subject matter, particularly illustrating a blade and a split platform.

Referring now to FIG. 4, an exploded perspective view of an alternative example of the monolithic composite component 100 is illustrated in accordance with aspects of the present subject matter. Particularly, FIG. 4 illustrates the blade 110 and a split platform 148 according to at least some aspects of the present disclosure. It should be appreciated that though the blade 110 and split platform 148 are shown separated for illustrative purposes in FIG. 4, the blade 110 and the split platform 148 may be inseperably coupled together to form the monolithic composite component 100. For instance, the split platform 148 may be inseperably coupled to the root 142 of the blade 110, such as at the blade attachment feature 112.

As shown in FIG. 4, the split platform 148 may extend generally circumferentially from the blade panel 118 on both the pressure side 124 and suction side 126 of the blade 110 with respect to the centerline 12 (FIG. 1). For instance, the split platform 148 may include radially outward facing pressure side flowpath surface 150 and suction side flowpath surface 152, each of which may be generally shaped as a segment of a cylinder. Further, the pressure and suction side flowpath surfaces 150, 152 may define a notch 154 therebetween in order to receive the blade 110 and/or to be formed onto the blade 110. As described in more detail in regard to FIG. 5, the split platform 148 may include a plurality of chopped fibers. The split platform 148 may include radially inwardly extending pressure side attachment feature 156 and suction side attachment feature 158, each of which may be configured to releasably engage shaft attachment feature 106 (FIG. 2). Attachment features 156, 158 of the split platform 148 may be constructed to have substantially the same circumferential cross-sections as blade attachment feature 112.

Figure 5:
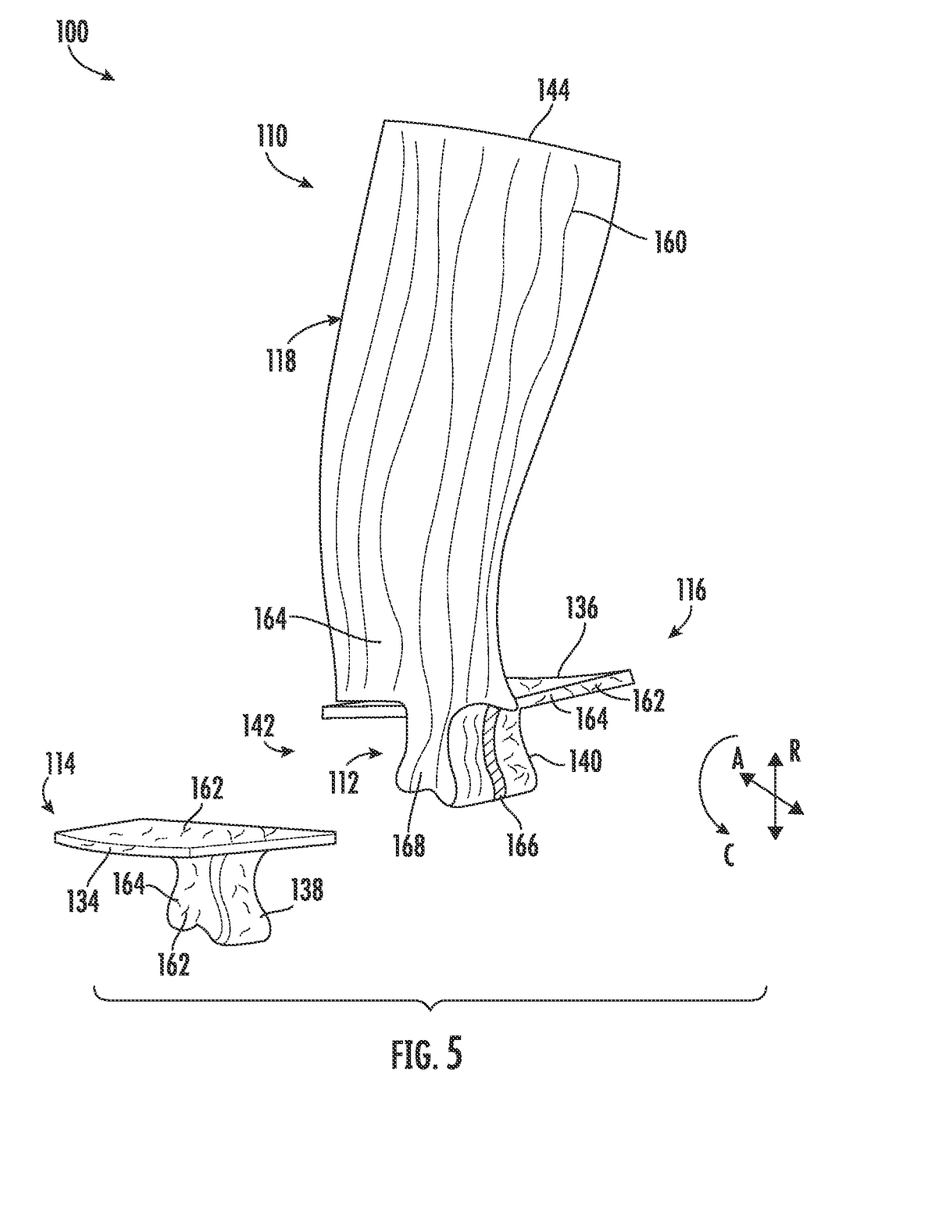

Referring now to FIG. 5, another view of an exemplary monolithic composite component 100 is illustrated in accordance with aspects of the present disclosure. Particularly, FIG. 5 illustrates a partially exploded view where the platform 114 is separated from the blade 110 while the platform 116 is shown monolithically formed to the blade 110. Though the monolithic composite component 100 of FIG. 5 is shown including the platforms 114, 116, in other embodiments the monolithic composite component 100 may include one of the platforms 114, 116, or any other suitable platform, such as split platform 148 of FIG. 4. As shown, the blade 110 and/or the blade attachment feature 112 may include a plurality of continuous fibers 160 (several of which are shown for illustrative purposes). For instance, one or more of the continuous fibers 160 may extend from the root 142 to the tip 144. As such, blade 110 may be a continuous fiber blade including a continuous fiber blade panel 118. As additionally shown in FIG. 5, the platforms 114, 116 may include a plurality of chopped fibers 162 (several of which are shown for illustrative purposes). As further explained below, the monolithic composite component 100 may include a thermoplastic polymer 164 in both the continuous fiber blade 110 and the chopped fiber platforms 114, 116.

Composite materials generally comprise a fibrous reinforcement material embedded in matrix material, such as polymer or ceramic material. The reinforcement material serves as a load-bearing constituent of the composite material, while the matrix of a composite material serves to bind the fibers together, and also acts as the medium by which an externally applied stress is transmitted and distributed to the fibers. Many polymer matrix composite (PMC) materials are fabricated with the use of prepreg, which is a fabric or unidirectional tape that is impregnated with resin. Multiple layers of prepreg are stacked to the proper thickness and orientation for the part, and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

A variety of fibrous reinforcement materials have been used in PMCs, for example, carbon (e.g., AS4), glass (e.g., S2), polymer (e.g., Kevlar®), ceramic (e.g. Nextel®) and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg as previously described.

Another complication is the type of reinforcement system required by PMC materials in aircraft engine applications. Generally, to achieve the mechanical properties required for aircraft engine applications, parts would require the use of continuous fiber-reinforced PMC materials to achieve the high performance mechanical requirements (particularly strength and fatigue properties) dictated by aircraft engine applications (e.g., blades 110). However, the manufacturing processes involved in the fabrication of continuous fiber reinforcement composite parts further complicate the ability to produce structures that have complex shapes. On the other hand, chopped fiber reinforcement systems, whether in a thermoplastic or thermoset resin matrix, are not ideal solutions for highly loaded parts due to their lower mechanical performance. However, it is possible to fabricate complex-shaped parts with chopped fiber material solutions with net-shaped molding methods, and therefore these material systems can be used for lightly-loaded secondary structures and non-structural engine components (e.g., the platforms 114, 116, and 148).

As engine performance continues to be pushed to limits, it is desirable to have parts of complex geometries that are capable of being highly loaded to aid or improve such performance. Many times, these complex geometries are non-structural features that help with, for example, aerodynamic performance. Therefore, taking a hybrid approach, a monolithic part is provided with hybrid fiber reinforcement to achieve structural loading yet providing for the complex shaped (lightly loaded) features, for example aero-features.

Referring back to the exemplary embodiment of FIG. 5, thermoplastic polymer 164 may include a bonding layer 166 between the continuous fiber blade 110 and the platform(s) 114, 116 (only one bonding layer 166 is shown for clarity). In certain embodiments, the thermoplastic polymer 164 may include one or more of PEKK, PEEK, PAEK, or PEI. In certain embodiments, thermoplastic polymer 164 may be the same within the blade 110 and platform(s) 114, 116 in order to reduce thermal gradients within the parts of the monolithic composite component 100.

Further, in one embodiment, the continuous fiber blade 110 may be formed, at least in part, by molding of a continuous fiber thermoplastic composite. For instance, the continuous fiber blade 110 may be constructed by laying up continuous fiber portions that are in a fabric, unidirectional tape, or braided architecture and the thermoplastic polymer 164 within a mold to define the aerodynamic profile of the blade 110. Further, the continuous fiber blade 110 may be formed of, for non-limiting examples, unidirectional prepreg, woven fabric prepreg, a braided prepreg, or a dry reinforcement fiber with filaments or fibers of thermoplastic polymer. Additionally, the platform 114, 116, 148 may be formed, at least in part, by at least one of compression molding or injection molding of the plurality of chopped fibers 162. In at least some embodiments, the chopped fibers 162 may be included in unidirectional tape that has been chopped to a short fiber length. The thermoplastic polymer 164 used in the chopped fiber unidirectional tape may be the same thermoplastic polymer 164 that is used in the continuous fiber blade 110. The use of the same thermoplastic polymer 164 within the blade 110 and platforms 114, 116, 148 may allow the component to be fabricated as the monolithic composite component 100 as depicted herein.

For example, the continuous fiber material may be continuous fibers 160 of individual fibers or fiber tows arranged parallel (unidirectional) with the matrix material, or individual fibers or fiber tows arranged to have multiple different orientations (e.g., multiple layers of unidirectional fibers or fiber tows to form bi-axial or tri-axial architecture) within the matrix material, or individual fibers or fiber tows, woven to form a mesh or fabric within the matrix material. The fibers, tows, braids, meshes, or fabrics can be arranged to define a single ply within the PMC or any suitable number of plies. Particularly suitable continuous fiber reinforcement materials include carbon, glass polymer, ceramic, and metal fibers.

According to one embodiment, the PMC material is defined in part by prepreg, which is a reinforcement material preimpregnated with a matrix material, such as thermoplastic resin desired for the matrix material. Non-limiting examples of processes for producing thermoplastic prepregs include hot melt prepregging in which the fiber reinforcement material is drawn through the molten bath of resin and powder prepregging in which a resin is deposited onto the fiber reinforcement material (for example electrostatically) and then adhered to the fiber (for example, in an oven or with the assistance of heated rollers). The prepregs can be in the form of unidirectional tapes or woven fabrics, which are then stacked on top of one another to create the number of stacked plies desired for the part. According to an alternative option, instead of using a prepreg, with the use of thermoplastic polymers it is possible to have a woven fabric that has, for example, dry carbon fiber woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fiber, carbon fiber, and thermoplastic fiber could all be woven together in various concentrations to tailor the properties of the part. The carbon fiber provides the strength of the system, the glass may be incorporated to enhance the impact properties, which is a design characteristic for parts located near the inlet of the engine, and the thermoplastic fibers are the matrix that will be flowed to bind the reinforcement fibers.

The ply stack may next undergo a consolidation operation, in which heat and pressure are applied to the ply stack to flow the resin and consolidate the ply stack into the part. In addition to creating parts using prepreg, an alternative approach is to lay-up dry fabric in a suitably shaped mold cavity and then infuse the dry fabric with molten resin. For instance, PMC materials can be produced by dispersing dry fibers into a mold, and then flowing matrix material around the reinforcement fibers.

According to the instant embodiment, the continuous fiber blade 110 or chopped fiber platform(s) 114, 116, 148 may be loaded into compression molds. Within these molds may be cavities corresponding to the shape of blade 110 or platform 114, 116, 148 respectively. Additionally, the platform(s) 114, 116, 148 may be coupled to the continuous fiber blade 110 via injection molding at an interface 168 between the continuous fiber blade 110 and the platform(s) 114, 116, 148 in order to form the bonding layer 166 and the monolithic composite component 100 as shown in FIG. 5. In another embodiment, the platform(s) 114, 116, 148 may be coupled to the continuous fiber blade 110 simultaneously with the molding of the platform(s) 114, 116, 148. For instance, the platform(s) 114, 116, 148 may be directly molded onto the continuous fiber blade 110 as to form the bonding layer(s) 166 at the interface(s) 168 of monolithic composite component 100.

Figure 6:
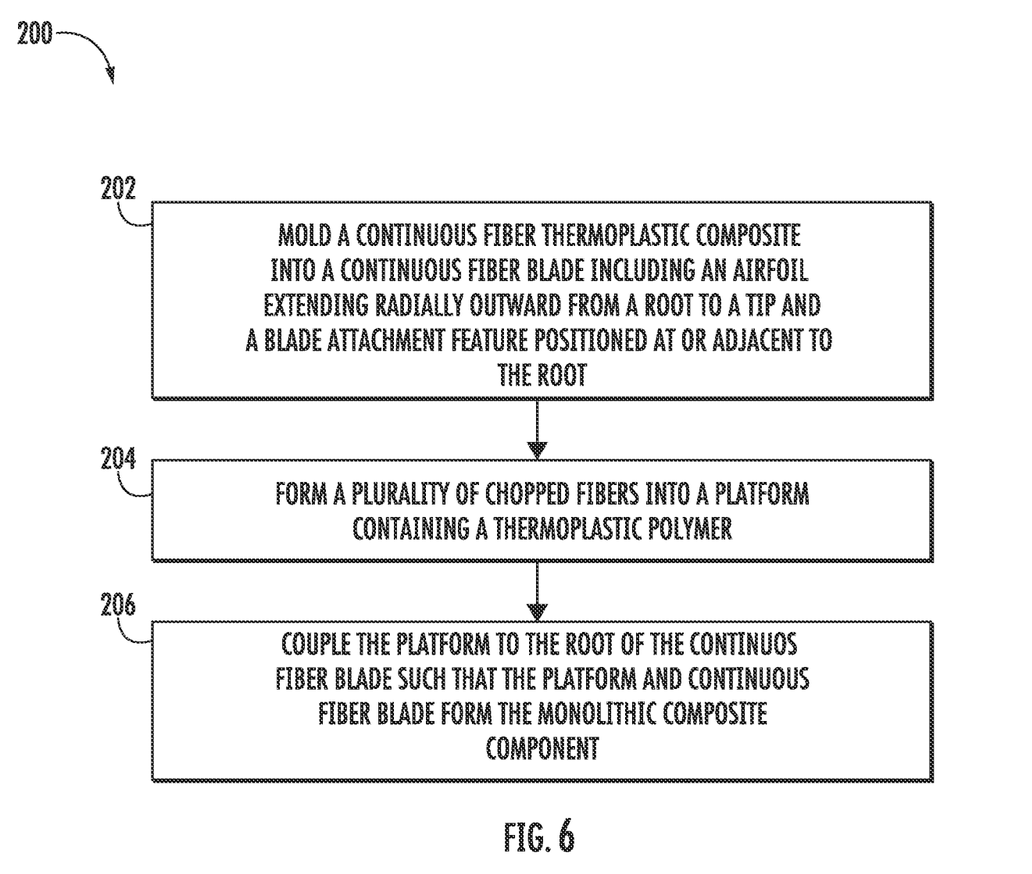
FIG. 6 illustrates a flow diagram of one embodiment of a method of forming a monolithic composite component for a gas turbine engine in accordance with aspects of the present disclosure.

Referring now to FIG. 6, a flow diagram of one embodiment of a method 200 of forming a monolithic composite component for a gas turbine engine is illustrated in accordance with aspects of the present disclosure. In general, the method 200 will be described herein with reference to the gas turbine engine 10 and monolithic composite component 100 described above in reference to FIGS. 1-5. However, it should be appreciated by those of ordinary skill in the art that the disclosed method 200 may generally be utilized to form any suitable monolithic composite component in connection with any gas turbine engine having any suitable configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As depicted in FIG. 6, the method 200 may include (202) molding a continuous fiber thermoplastic composite into the continuous fiber blade 110 including the airfoil 120 extending radially outward from the root 142 to the tip 144 and the blade attachment feature 112 positioned at or adjacent to the root 142. The method 200 may additionally include (204) forming a plurality of chopped fibers 162 into the platform (e.g., any of the platforms 114, 116, 148) containing the thermoplastic polymer 164. In one embodiment, forming the plurality of chopped fibers 162 into the platform may include at least one of compression molding or injection molding of the chopped fibers 162.

Further, the method 200 may include (206) coupling the platform to the root 142 of the continuous fiber blade 110 such that the platform and continuous fiber blade 110 form the monolithic composite component 100. In one particular embodiment, coupling the platform to the root 142 of the continuous fiber blade 110 may include utilizing injection molding at the interface 168 between the platform and the continuous fiber blade 110. In an additional and/or alternative embodiment, coupling the platform to the root 142 of the continuous fiber blade 110 may include simultaneously coupling the platform to the continuous fiber blade 110 while molding the platform.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a monolithic composite component for a gas turbine engine, the method comprising:
    molding a continuous fiber thermoplastic composite including a thermoplastic polymer into a consolidated continuous fiber blade including an airfoil extending radially outward from a root to a tip and a blade attachment feature positioned at or adjacent to the root;
    forming a plurality of chopped fibers into a consolidated platform containing the thermoplastic polymer; and
    coupling the consolidated platform to the root of the consolidated continuous fiber blade in an injection molding process with the thermoplastic polymer such that the consolidated platform and the consolidated continuous fiber blade form the monolithic composite component.

2. The method of claim 1, wherein forming the plurality of chopped fibers into the consolidated platform comprises at least one of compression molding or injection molding of the plurality of chopped fibers.

3. The method of claim 1, wherein coupling the consolidated platform to the root of the consolidated continuous fiber blade comprises utilizing injection molding at an interface between the platform and the consolidated continuous fiber blade.

4. The method of claim 2, wherein coupling the consolidated platform to the root of the consolidated continuous fiber blade comprises simultaneously coupling the consolidated platform to the consolidated continuous fiber blade while molding the consolidated platform.

5. The method of claim 1, wherein the consolidated platform comprises a split platform defining a notch such that the consolidated continuous fiber blade is received within the notch and coupled to the split platform at the notch.

6. The method of claim 5, wherein coupling the split platform to the root of the consolidated continuous fiber blade comprises utilizing injection molding at an interface between the notch and the consolidated continuous fiber blade.

7. The method of claim 5, wherein the notch comprises an opening about an axial edge of the split platform.

8. The method of claim 1, wherein the consolidated platform is coupled to the consolidated continuous fiber blade via injection molding at an interface between the consolidated platform and the consolidated continuous fiber blade.

9. The method of claim 1, wherein the consolidated continuous fiber blade defines a pressure side and a suction side, and wherein the consolidated platform is coupled to the pressure side or suction side of the consolidated continuous fiber blade.

10. The method of claim 1, wherein the continuous fiber blade defines a pressure side and a suction side, and wherein the consolidated platform comprises two platforms, a first platform coupled to the pressure side of the consolidated continuous fiber blade, and a second platform coupled to the suction side of the consolidated continuous fiber blade.

11. The method of claim 1, wherein the thermoplastic polymer comprises at least one of PEKK, PEEK, PAEK, or PEI.

12. The method of claim 1, wherein the consolidated continuous fiber blade comprises a plurality of fibers arranged in parallel.

13. The method of claim 1, wherein the consolidated continuous fiber blade comprises a plurality of fibers arranged to have multiple different orientations.

14. A method of forming a monolithic composite component for a gas turbine engine, the method comprising:
   molding a continuous fiber thermoplastic composite including a thermoplastic polymer into a consolidated continuous fiber blade including an airfoil extending radially outward from a root to a tip and a blade attachment feature positioned at or adjacent to the root;
   forming a plurality of chopped fibers into a consolidated platform containing the thermoplastic polymer, wherein the consolidated platform comprises a split platform defining a notch such that the consolidated continuous fiber blade is received within the notch and coupled to the split platform at the notch; and
   coupling the consolidated platform to the root of the consolidated continuous fiber blade such that the consolidated platform and consolidated continuous fiber blade form the monolithic composite component, wherein coupling the consolidated platform to the root of the consolidated continuous fiber blade comprises utilizing injection molding with the thermoplastic polymer at an interface between the consolidated platform and the consolidated continuous fiber blade, and wherein coupling the consolidated platform to the root of the consolidated continuous fiber blade comprises simultaneously coupling the consolidated platform to the consolidated continuous fiber blade while molding the consolidated platform.

15. The method of claim 14, wherein the notch comprises an opening about an axial edge of the consolidated platform.

16. The method of claim 14, wherein the consolidated continuous fiber blade comprises a plurality of fibers arranged in parallel.

17. The method of claim 14, wherein forming the plurality of chopped fibers into the consolidated platform comprises at least one of compression molding or injection molding of the chopped fibers.

18. The method of claim 14, wherein the consolidated continuous fiber blade defines a pressure side and a suction side, and wherein the consolidated platform is coupled to the pressure side or suction side of the consolidated continuous fiber blade.

19. The method of claim 14, wherein the consolidated continuous fiber blade defines a pressure side and a suction side, and wherein the consolidated platform comprises two platforms, a first platform coupled to the pressure side of the consolidated continuous fiber blade, and a second platform coupled to the suction side of the consolidated continuous fiber blade.

20. The method of claim 14, wherein the thermoplastic polymer comprises at least one of PEKK, PEEK, PAEK, or PEI.

\* \* \* \* \*